United States Patent
Bergant et al.

(10) Patent No.: US 7,765,187 B2
(45) Date of Patent: Jul. 27, 2010

(54) REPLICATION OF A CONSISTENCY GROUP OF DATA STORAGE OBJECTS FROM SERVERS IN A DATA NETWORK

(75) Inventors: Milena Bergant, North Grafton, MA (US); John M. Hayden, Holliston, MA (US); Daniel Zhu, Nashua, NH (US); Jiannan Zheng, Ashland, MA (US)

(73) Assignee: EMC Corporation, Hopkinton, MA (US)

( * ) Notice: Subject to any disclaimer, the term of this patent is extended or adjusted under 35 U.S.C. 154(b) by 1275 days.

(21) Appl. No.: 11/288,578

(22) Filed: Nov. 29, 2005

(65) Prior Publication Data

US 2007/0136389 A1     Jun. 14, 2007

(51) Int. Cl.
*G06F 17/00* (2006.01)
(52) U.S. Cl. ............... 707/614; 707/690; 707/704
(58) Field of Classification Search ............ 707/10, 707/200, 204, 201
See application file for complete search history.

(56) References Cited

U.S. PATENT DOCUMENTS

| | | | |
|---|---|---|---|
| 5,434,994 A | 7/1995 | Shaheen et al. ............. 395/500 |
| 5,504,899 A | 4/1996 | Raz ............................. 395/650 |
| 5,504,900 A | 4/1996 | Raz ............................. 395/650 |
| 5,596,706 A | 1/1997 | Shimazaki et al. ..... 395/182.04 |
| 5,701,480 A | 12/1997 | Raz ............................. 359/600 |
| 5,832,225 A * | 11/1998 | Hacherl et al. ............ 707/999.2 |
| 5,893,140 A | 4/1999 | Vahalia et al. ............... 711/118 |
| 5,901,327 A | 5/1999 | Ofek ........................... 395/825 |
| 5,974,563 A | 10/1999 | Beeler, Jr. ........................ 714/5 |
| 6,016,501 A | 1/2000 | Martin et al. ................. 707/203 |
| 6,049,809 A * | 4/2000 | Raman et al. .......... 707/999.203 |
| 6,101,497 A | 8/2000 | Ofek ............................ 707/10 |
| 6,324,581 B1 | 11/2001 | Xu et al. ...................... 709/229 |
| 6,654,912 B1 | 11/2003 | Viswanathan et al. .......... 714/42 |
| 6,665,815 B1 | 12/2003 | Goldstein et al. ............. 714/20 |

(Continued)

FOREIGN PATENT DOCUMENTS

EP     0 672 985 A1     9/1995

(Continued)

OTHER PUBLICATIONS

EMC Celerra SE5 File Server, EMC Corporation, Hopkinton, Mass. 01748-9103, Feb. 2002, 2 pages.

(Continued)

*Primary Examiner*—Charles Rones
*Assistant Examiner*—Rezwanul Mahmood
(74) *Attorney, Agent, or Firm*—Richard Auchterlonie; Novak Druce & Quigg, LLP

(57) ABSTRACT

Consistency errors may arise during replication of diverse data storage objects from servers in a data network. For preventing consistency errors, a server is programmed for responding to a request for a report of whether or not the server can replicate the dataset without causing a consistency error. Such a report is useful for replicating a consistency group of objects from more than one server. Preparation for replication can be begun at each of the servers, and if any of the servers fail to report that replication can be done without causing a consistency error, the preparation can be aborted so that write access by applications will not be disrupted while the potential problem is diagnosed and eliminated.

11 Claims, 13 Drawing Sheets

U.S. PATENT DOCUMENTS

| | | | |
|---|---|---|---|
| 6,675,153 B1 | 1/2004 | Cook et al. | |
| 6,691,245 B1 | 2/2004 | DeKoning | 714/6 |
| 6,694,447 B1 | 2/2004 | Leach et al. | 714/6 |
| 6,732,124 B1 | 5/2004 | Koseki et al. | 707/202 |
| 6,941,490 B2 | 9/2005 | Ohran | 714/15 |
| 6,948,089 B2 | 9/2005 | Fujibayashi | 714/6 |
| 6,959,310 B2 | 10/2005 | Eshel et al. | |
| 7,324,999 B2 * | 1/2008 | Judd | 707/690 |
| 7,373,364 B1 | 5/2008 | Chapman | |
| 7,376,673 B1 * | 5/2008 | Chalecki et al. | 707/999.2 |
| 7,475,098 B2 | 1/2009 | Patterson et al. | |
| 7,478,211 B2 * | 1/2009 | Shackelford et al. | 707/999.203 |
| 7,509,465 B1 | 3/2009 | Misra et al. | |
| 2001/0044910 A1 | 11/2001 | Ricart et al. | 714/6 |
| 2002/0112134 A1 | 8/2002 | Ohran et al. | 711/162 |
| 2003/0093413 A1 | 5/2003 | Dettinger et al. | |
| 2003/0177194 A1 | 9/2003 | Crocker et al. | |
| 2003/0200480 A1 | 10/2003 | Beattie | |
| 2003/0217119 A1 | 11/2003 | Raman et al. | 709/219 |
| 2004/0163009 A1 | 8/2004 | Goldstein et al. | 714/6 |
| 2004/0260873 A1 * | 12/2004 | Watanabe | 711/114 |
| 2004/0267758 A1 * | 12/2004 | Katsurashima | 707/10 |
| 2004/0267836 A1 | 12/2004 | Armangau et al. | 707/203 |
| 2005/0015663 A1 | 1/2005 | Armangau et al. | 714/15 |
| 2005/0044162 A1 | 2/2005 | Liang et al. | 709/212 |
| 2005/0114408 A1 | 5/2005 | Gold et al. | |
| 2005/0193245 A1 | 9/2005 | Hayden et al. | 714/13 |
| 2005/0228950 A1 | 10/2005 | Karr | |
| 2005/0234931 A1 | 10/2005 | Yip et al. | |
| 2006/0031188 A1 | 2/2006 | Lara et al. | |
| 2006/0149997 A1 | 7/2006 | Chai et al. | |
| 2006/0179261 A1 * | 8/2006 | Rajan | 711/162 |
| 2007/0061379 A1 * | 3/2007 | Wong et al. | 707/201 |
| 2007/0067263 A1 | 3/2007 | Husain et al. | |
| 2007/0078982 A1 | 4/2007 | Aidun et al. | |
| 2007/0094467 A1 | 4/2007 | Yamasaki | |
| 2007/0168516 A1 | 7/2007 | Liu et al. | |
| 2007/0198659 A1 | 8/2007 | Lam | |
| 2007/0208783 A1 | 9/2007 | Midgley et al. | |
| 2007/0255818 A1 | 11/2007 | Tanzer et al. | |
| 2007/0276885 A1 | 11/2007 | Valiyaparambil et al. | |
| 2008/0005468 A1 | 1/2008 | Faibish et al. | |
| 2008/0250086 A1 | 10/2008 | Kisley | |
| 2008/0250215 A1 * | 10/2008 | Shitomi | 711/162 |

FOREIGN PATENT DOCUMENTS

| | | |
|---|---|---|
| EP | 0 674 263 A1 | 9/1995 |

OTHER PUBLICATIONS

"Celerra File Server in the E-Infostructure" EMC Corporation, Hopkinton, Mass., 2000, 9 pages.

"Celerra File Server Architecture for High Availability," EMC Corporation, Hopkinton, Mass., Aug. 1999, 11 pages.

Prabhu Ram & Lyman Do, "Extracting Delta for Incremental Data Warehouse Maintenance" 16$^{th}$ International Conference on Data Engineering, San Diego, CA, Feb. 28-Mar. 3, 2000, Proceedings, pp. 220-229, IEEE Computer Society, IEEE, New York, NY.

Chutani, Sailesh, et al., "The Episode File System," Carnegie Mellon University IT Center, Pittsburgh, PA, Jun. 1991, 18 pages.

D.L. Burkes and R.K. Treiber, "Design Approaches for Real-Time Transaction Processing Remote Site Recovery," Digest of Papers in Spring COMPCON90, Feb. 26-Mar. 2, 1990, *Thirty-Fifth IEEE Computer Society International Conference*, San Francisco, CA, pp. 568-572, IEEE, New York, NY.

"Network Data Management Protocol (NDMP)," ndmp.org; NDMP White Paper, "Protocol Specification Summary, Document Version: 1.7.2S," ndmp.org; "Legato Systems Embraces the NDMP Standard; Legato Networker Software to be NDMP Compliant in Q3," legata. com; published at least as early as Oct. 11, 1999, 17 pages.

R. Stager and D. Hitz, Internet Draft filename "draft-stager-iquard-netapp-backup-05.txt," *Network Data Management Protocol (NDMP)*, last update Oct. 12, 1999, pp. 1-73.

Koop, P., "Replication at Work. (four companies use Oracle and Sybase replication servers to solve business problems)," DBMS, vol. 8, No. 3, p. 54(4), Mar. 1995.

"Remote Mirroring Technical White Paper," Copyright 1994-2002 Sun Microsystems, Santa Clara, CA, published at least as early as May 17, 2002 at sun.com, 25 pages.

"EMC TechNote: Celerra Replicator," EMC Corporation, Hopkinton, MA, 2002, 5 pages.

"EMC TimeFinder Product Description Guide", EMC Corporation, Hopkinton, MA, Dec. 1998, 34 pages.

"Leveraging SnapView/IP in Oracle8i Environments with CLARiiON IP4700 File Server," Engineering White Paper, EMC Corporation, Hopkinton, MA, Feb. 13, 2002, 17 pages.

"Using EMC CLARiiON FC4700 and SnapView with Oracle 8i," Engineering White Paper, EMC Corporation, Hopkinton, MA, Mar. 4, 2002, pp. 1-22.

"Disaster Recovery Guidelines for using HP SureStore E XP256, Continuous Access XP with Oracle Databases," Rev 1.03, Hewlett-Packard Company, Palo Alto, CA, May 24, 2000, pp. 1-28.

"Enterprise Volume Manager and Oracle8 Best Practices," Compaq White Paper, Compaq Computer Corporation, Dec. 1999, pp. 1-11.

Veritas Database Edition for Oracle, "Guidelines for Using Storage Checkpoint and Storage Rollback with Oracle Databases," Veritas Software Corporation, Mountain View, CA, Aug. 2001, 19 pages.

"Veritas Volume Replication and Oracle Databases," A Solutions White Paper, Veritas Software Corporation, Mountain View, CA, May 29, 2000, pp. 1-31.

Nabil Osorio and Bill Lee, "Guidelines for Using Snapshot Storage Systems for Oracle Databases," Oracle Corporation, Oct. 2001, 13 pages.

"EMC PowerPath—Storage Virtualization," EMC Corporation, Hopkinton, MA, Sep. 2003, 2 pages.

"EMC Symmetrix Data Migration Services," EMC Corporation, Hopkinton, MA, Jul. 2001, 4 pages.

"Global Recovery Demonstration: SRDF/A and Primecluster," EMC Corporation, Hopkinton, MA, Feb. 2004, 27 pages.

"Using Asynchronous Replication for Business Continuity between Two or More Sites," EMC Corporation, Hopkinton, MA, Dec. 2004, 20 pages.

"EMC Open Replicator for Symmetrix," EMC Corporation, Hopkinton, MA, Jan. 2005, 12 pages.

John Phillips, "Storage Consolidation and Data Protection using MultiStore™," Network Appliance, Inc., Sunnyvale, CA, Feb. 18, 2003, 13 pages.

Ningning Zhu, "Data Versioning Systems," Research Proficiency Exam Report, ECSL Technical reports (TR-131), www.ecsi.cs.sunysb.edu/tech_reports.html, 33 pages, Feb. 2003, Computer Science Department, Stony Brook University, Stony Brook, NY.

* cited by examiner

REPLICATION OF A CONSISTENCY GROUP OF DATA STORAGE OBJECTS FROM SERVERS IN A DATA NETWORK

FIELD OF THE INVENTION

The present invention relates generally to data processing, and more particularly to replication of data storage objects from computer data storage of servers in a data network.

BACKGROUND OF THE INVENTION

Remote copy systems have been used for automatically providing data backup at a remote site in order to insure continued data availability after a disaster at a primary site. Such a remote copy facility is described in Ofek, U.S. Pat. No. 5,901,327 issued May 4, 1999, entitled "Bundling of Write Data from Channel Commands in a Command Chain for Transmission over a Data Link Between Data Storage Systems For Remote Data Mirroring." This remote copy facility uses a dedicated network link and a link-layer protocol for 1:1 replication between a primary storage system and a secondary storage system.

More recently remote copy systems have been used for wide-area distribution of read-only data. Wide-area distribution of the read-only data is useful for preventing remote users from overloading a local server, and for reducing signal transmission delay because the remote users may access remote copies nearer to them. For example, as described in Raman et al., U.S. Patent Application Publication No. US 2003/0217119 A1, published Nov. 20, 2003, incorporated herein by reference, consistent updates are made automatically over a wide-area IP network, concurrently with read-only access to the remote copies. A replication control protocol (RCP) is layered over TCP/IP providing the capability for a remote site to replicate and rebroadcast blocks of the remote copy data to specified groups of destinations, as configured in a routing table.

Currently there is a need for replicating diverse data storage objects in a way that is scalable and efficient and may use a replication control protocol for one-to-many replication and cascaded replication over a data network.

SUMMARY OF THE INVENTION

In accordance with one aspect, the invention provides a computer-implemented method of operating a server in a data processing network. The method includes the server receiving a request to determine whether or not the server can replicate a dataset from computer data storage of the server without causing a consistency error, and the server responding to the request by determining whether or not the server can replicate the dataset from the computer data storage of the server without causing a consistency error, and reporting whether or not the server can replicate the dataset from the computer data storage of the server without causing a consistency error.

In accordance with another aspect, the invention provides a computer-implemented method of replicating data storage objects from respective servers over a data network. The method includes the servers modifying the data storage objects in computer data storage of the servers by executing transactions of applications upon the data storage objects, and at least one of the applications accessing at least some of the data storage objects in the computer data storage of more than one of the servers. The method also includes temporarily suspending write access of the applications at the servers to the data storage objects upon completion of pending transactions of the applications, replicating the data storage objects to produce a replica of a consistency group for transmission of the replica of the consistency group over the data network from the servers, resuming write access of each of the applications to the data storage objects, and transmitting the replica of the consistency group over the data network from the servers.

BRIEF DESCRIPTION OF THE DRAWINGS

Additional features and advantages of the invention will be described below with reference to the drawings, in which.

Figure 1:
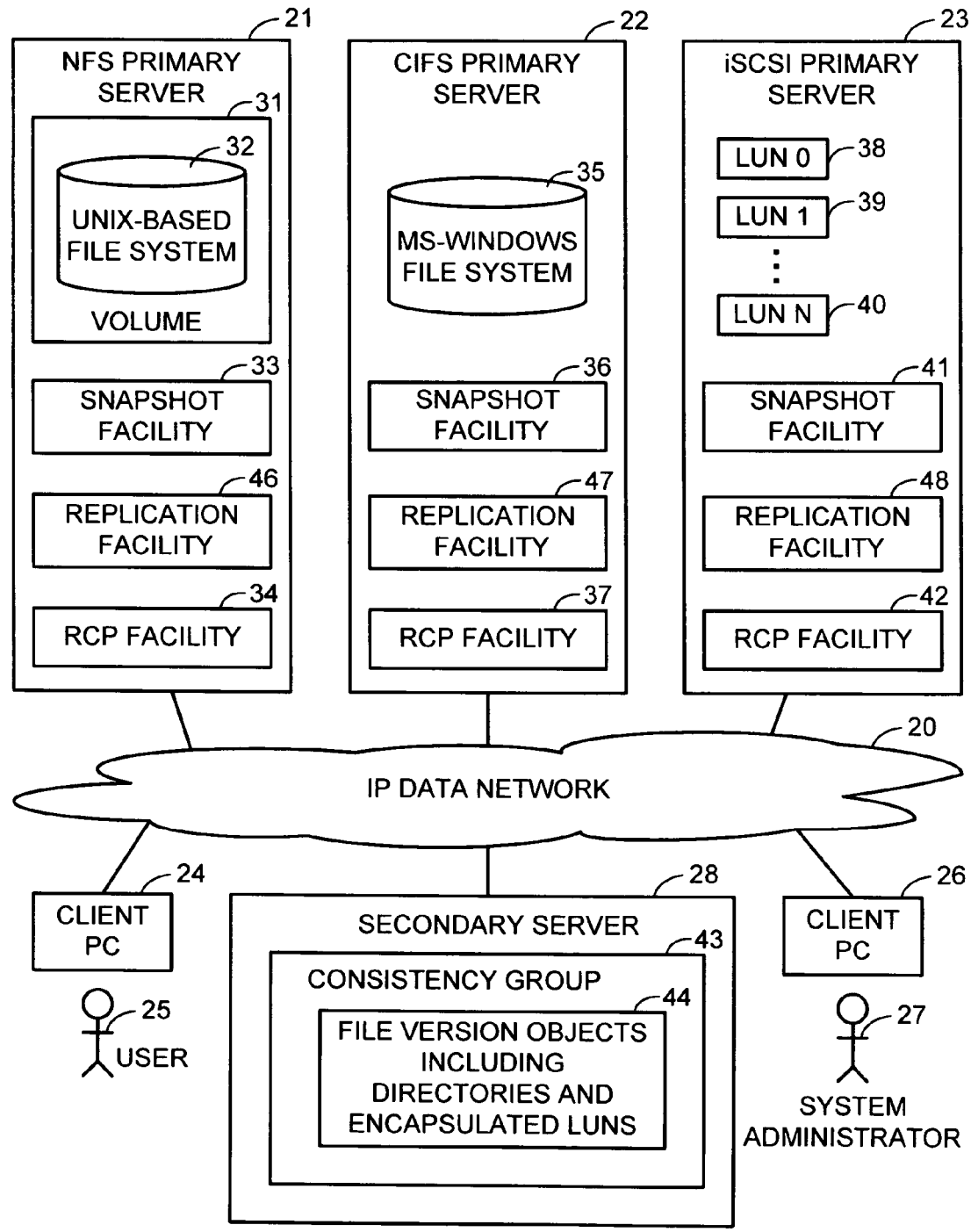
FIG. 1 is a block diagram of a data network in which data storage objects from different primary servers have been combined into a consistency grout that has been replicated to a secondary server.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

With reference to FIG. 1, there is shown a block diagram of an Internet Protocol (IP) data network 20 including multiple primary servers 21, 22, 23, for providing read-write storage access to a large number of clients such as personal computers (PCs) 24 and 26 operated by respective human users 25 and 27. The IP data network 20 further includes at least one secondary server 28 for storing backup copies of data from the primary servers 21, 22, 23. As will be described further below with respect to FIG. 3, backup copies can be stored on multiple secondary servers.

In the data network of FIG. 1, the each of the primary servers 21, 22, 23 provides storage access using a different kind of high-level storage access protocol. For example, the primary server 21 has a volume of storage 31 containing a UNIX-based file system 32, and a network client accesses the UNIX-based file system 32 using the Network File System (NFS) protocol. The primary server 22 contains a Microsoft (MS) Windows file system 35, and a network client accesses the MS-Windows file system 35 using the Common Internet File System (CIFS) protocol. The primary server 23 contains a number of logical unit numbers (LUNs) of storage 38, 39, 40, and a network client accesses the LUNs using the Internet Small Computer System Interface (iSCSI) protocol.

In the past, a respective different kind of client application used each different kind of storage access protocol for accessing each different kind of data storage object. For example, a UNIX application running on a SUN workstation would use the NFS protocol for accessing a UNIX-based file system, a Microsoft application such as Microsoft Office Word or Microsoft Office Outlook would use the CIFS protocol for accessing a MS-Windows file system, and a mainframe computer running a scientific application would use the iSCSI protocol for accessing the LUNS 38, 39, and 40. Recently, however, there have been an increasing number of applications that may access data using more than one storage access protocol. For example, a format conversion application may import data from a UNIX-based file system and export the data to an MS-Windows file system, so that an MS-Windows application may have access to data generated by a UNIX legacy application.

As introduced above, remote copy systems are useful for backup and recovery, and also for wide-area distribution of read-only data. To provide remote copy service in the network 20 of FIG. 1, each of the primary file servers 21, 22, 23 has a respective snapshot facility 33, 36, 41, a respective replication facility 46, 47, 48, and a respective replication control protocol (RCP) facility 34, 37, 42. The snapshot facilities 33, 36, 41 can make snapshots of various kinds of data storage objects such as LUNs, files, directories, file systems, or volumes, and the snapshots of these data storage objects can be replicated over the IP data network 20 to one or more secondary servers. For example, in each of the primary servers, the snapshot facility and the RCP facility can be constructed as described in the above-cited Raman et al., U.S. Patent Application Publication No. US 2003/0217119 A1, published Nov. 20, 2003, incorporated herein by reference; Armangau et al., U.S. Patent Application Publication No. US 2004/0267836 published Dec. 30, 2004, incorporated herein by reference; Armangau et al., U.S. Patent Application Publication No. US 2005/0015663 A1, published Jan. 20, 2005, incorporated herein by reference; and John Hayden et al., Internet Protocol Based Disaster Recovery of a Server, U.S. Patent Application Publication No. US 2005/0193245A1, published Sep. 1, 2005, incorporated herein by reference.

In each of the primary servers 21, 22, 23, the replication facility 46, 47, 48 determines the difference or "delta" between consecutive snapshots, assembles the delta into a Delta Extent format, and invokes the RPC facility to transmit the delta in the Delta Extent format over the IP data network 20 to the secondary server 28.

Figure 2:
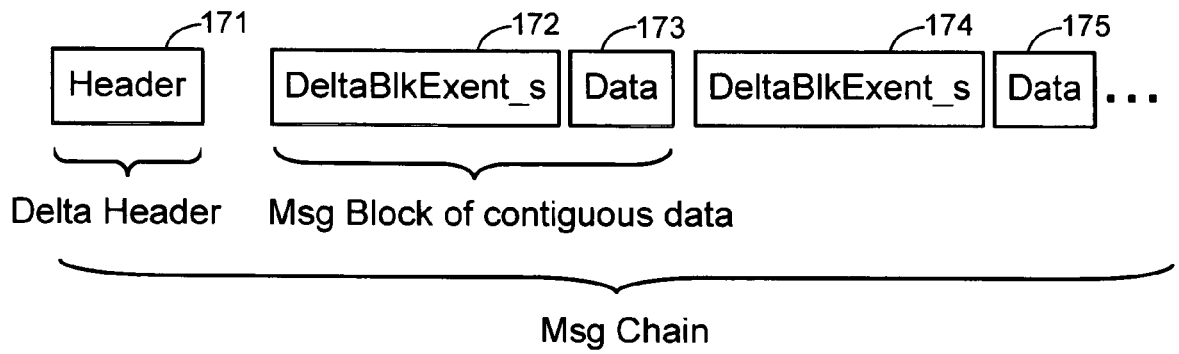
FIG. 2 is a block diagram of a Delta Extent format for transmitting data defining a change or delta between two snapshots.

As shown in FIG. 2, the Delta Extent format includes a Delta Header 71, a DeltaBlkExtent_s 172, data 173, DeltaBlkExtent_s 174, and data 175. The Delta Header 71 specifies an object to which the delta relates, the DeltaBlkExtent_s 172, 174 defines an extent by specifying a start address and length in the object of following contiguous data 173, 174. For a delta, the following contiguous data is the new data of the change between the older snapshot and the newer snapshot. The combination of a DeltaBlkExtent_s and following data define a Message Block of contiguous data. The Delta Header and following Message Blocks of contiguous data comprise a Message Chain.

In general, the snapshot facility, replication facility, and RCP facility in each primary server can be used as described in the above-cited published patent applications to replicate a snapshot copy of a file system from the primary server to a secondary server concurrent with read-write access by applications to the file system. Then the snapshot facility, replication facility, and RCP facility in each primary server can periodically replicate a snapshot of a change or "delta" of the file system since the last snapshot from the primary server to the secondary server. In a background process, the secondary server can replay the oldest delta snapshot into the snapshot copy of the file system, in order to maintain a remote backup copy for remote read-only access or for restoration in case of corruption or loss of the primary file system.

In accordance with an aspect of the present invention, a consistency group of data storage objects from different servers are replicated across the IP network 20 to one or more secondary servers such as the secondary server 28. For example, in a consistency group, file version objects from the different primary servers are kept consistent with each other despite the fact that an application may access the original data storage objects from more than one of the primary servers. Also, the delta between successive snapshots of the consistency group can be created concurrently for data storage objects in different primary servers in such a way that the delta created at the different primary servers are consistent with each other despite the fact that an application may access the original data storage objects from more than one of the primary servers.

As shown in FIG. 1, the consistency group 43 includes file version objects 44 including directories and LUNS encapsulated into files. File systems can also be encapsulated into file versions, or they can be encapsulated into volume versions or directory snapshots. The objects in the consistency group can be linked in a hierarchical or list fashion so that directory and file version objects are contained in file systems, and the different versions of the same object can be maintained in chronological lists (see, for example, FIG. 7). In a preferred organization, all of the objects 44 are files, and the consistency group 43 is a file system consisting of the files of the objects 44, and a root directory for the consistency group. In a preferred implementation, the file versions of the consistency group are managed as sparse files.

FIG. shows that objects in the consistency group can be replicated to multiple secondary servers. In addition to the first secondary server 28, the network 20 has a second secondary server 181 and a third secondary server 182. Each secondary server can receive copies of some or all of the objects in the consistency group. For example, the first secondary server 28 stores copies 43 of all of the objects in the consistency group, the second secondary server 181 stores copies 183 of consistency group objects from the NFS primary server 21 and the CIFS primary server 22, and the third secondary server 182 stores copies 184 of consistency group objects from the iSCSI primary server 23.

Figure 4:
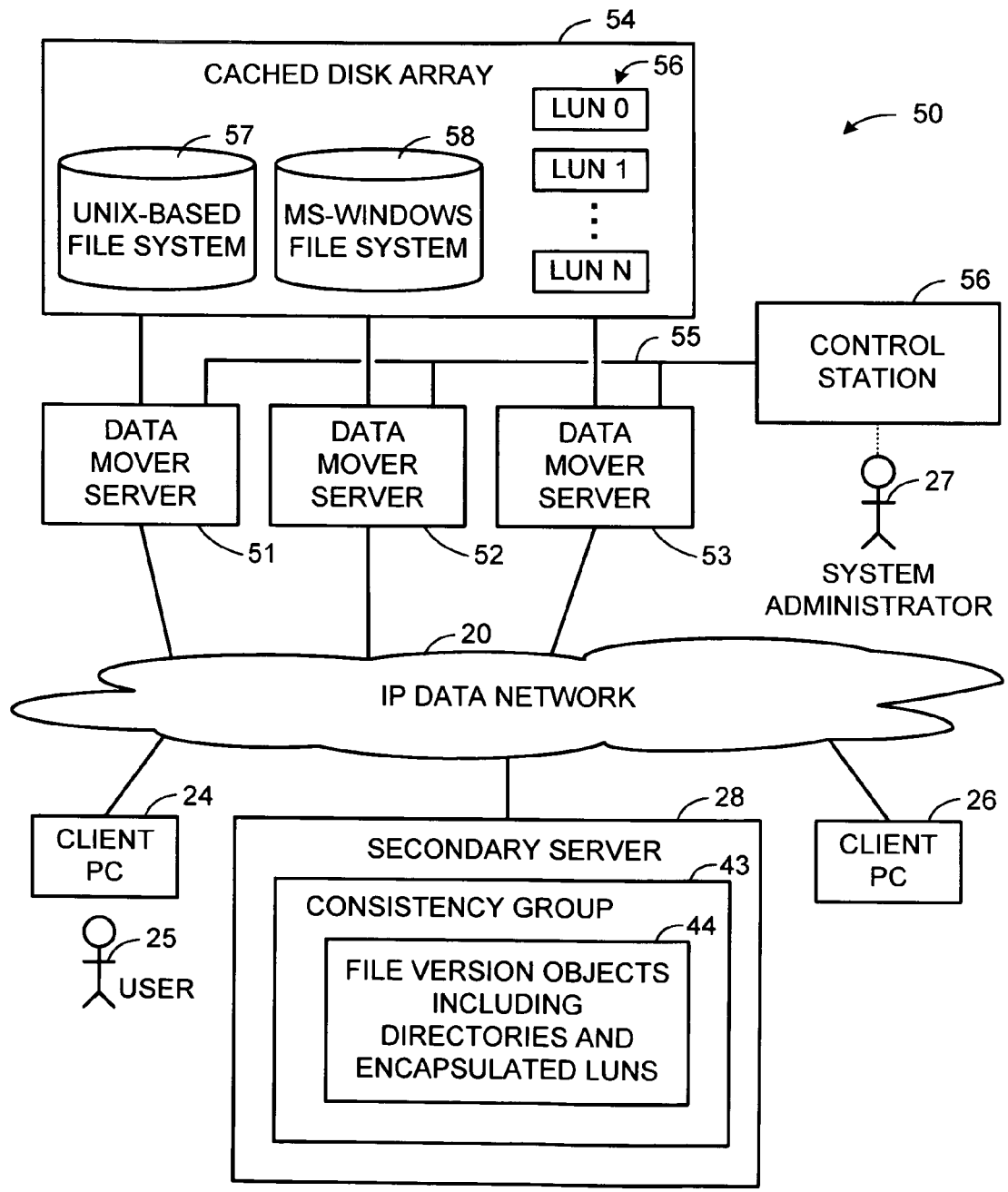
FIG. 4 is a block diagram showing multiple primary servers sharing access to cached disk array.

FIG. 4 shows that multiple primary servers 51, 52, 53 may share access to common storage such as a cached disk array 54. However, it is possible for some of the primary servers to share access to one cached disk array, and others of the primary servers to share access to another cached disk array. In FIG. 4, the primary servers 51, 52, 53 are data movers of a network file server generally designated 50, which may be constructed as described, for example, in Vahalia et al., U.S. Pat. No. 5,893,140, incorporated herein by reference; Xu et al., U.S. Pat. No. 6,324,581, incorporated herein by reference; and Liang et al, U.S. Patent Application Publication US 2005-0044162 A1 published Feb. 24, 2005, incorporated herein by reference. A control station 56 is connected via a dedicated dual-redundant data link 55 among the data movers 51, 52, 53 for configuring the data movers and the cached disk array 54.

The cached disk array 54 may contain different kinds of data storage objects that are accessible by applications using different kinds of storage access protocols. For example, the cached disk array 54 is shown to contain a UNIX-based file system 57 accessible through the NFS protocol, a MS-Windows file system 58 accessible through the CIFS protocol, and set of storage LUNS 56 accessible through the iSCSI protocol. Because the data movers share access to the cached disk array 54, the data movers can be programmed and configured to permit any client to use any one of the data movers to provide read-write access to any of the data storage objects 57, 58, and 56. Alternatively, the data movers can be programmed and configured so that a particular data storage object in the cached disk array 54 is accessible to a client only through a particular one of the data movers.

Figure 3:
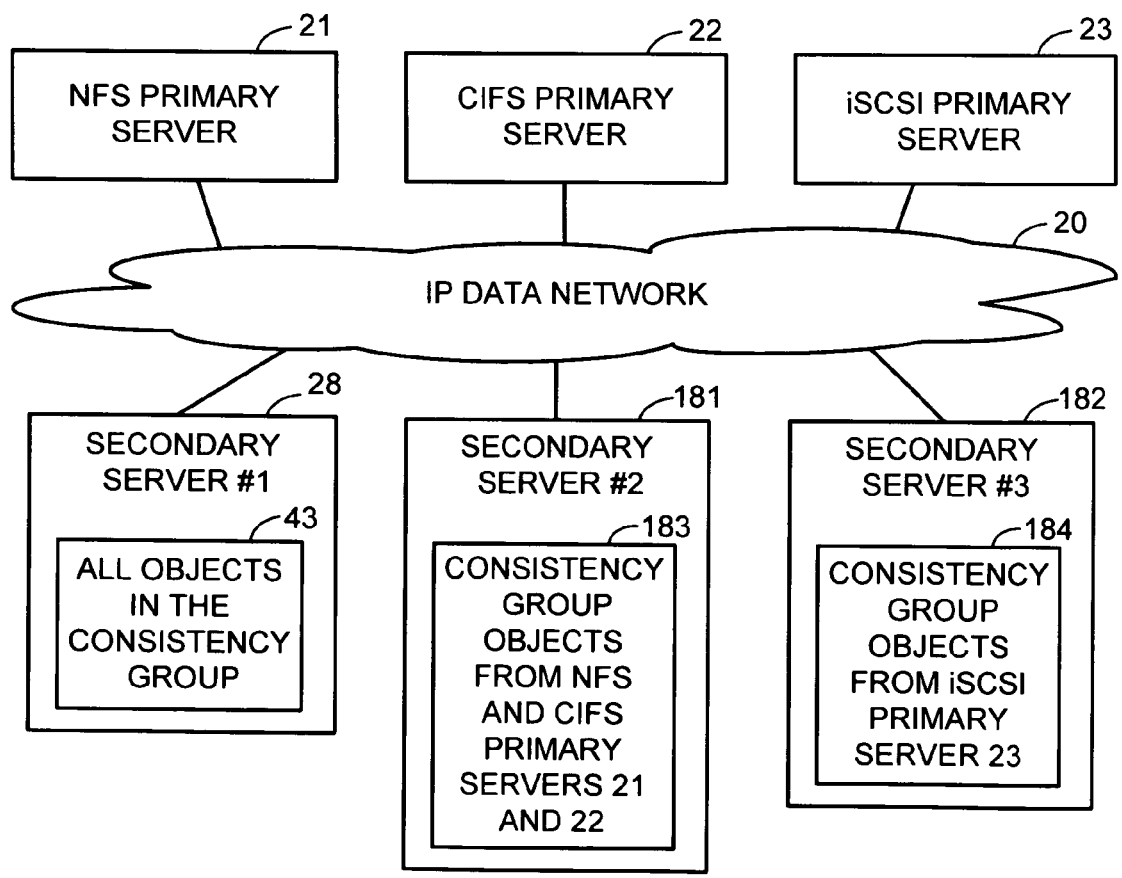
FIG. 3 is a block diagram showing that objects in the consistency group can be replicated to multiple secondary servers.
Figure 5:
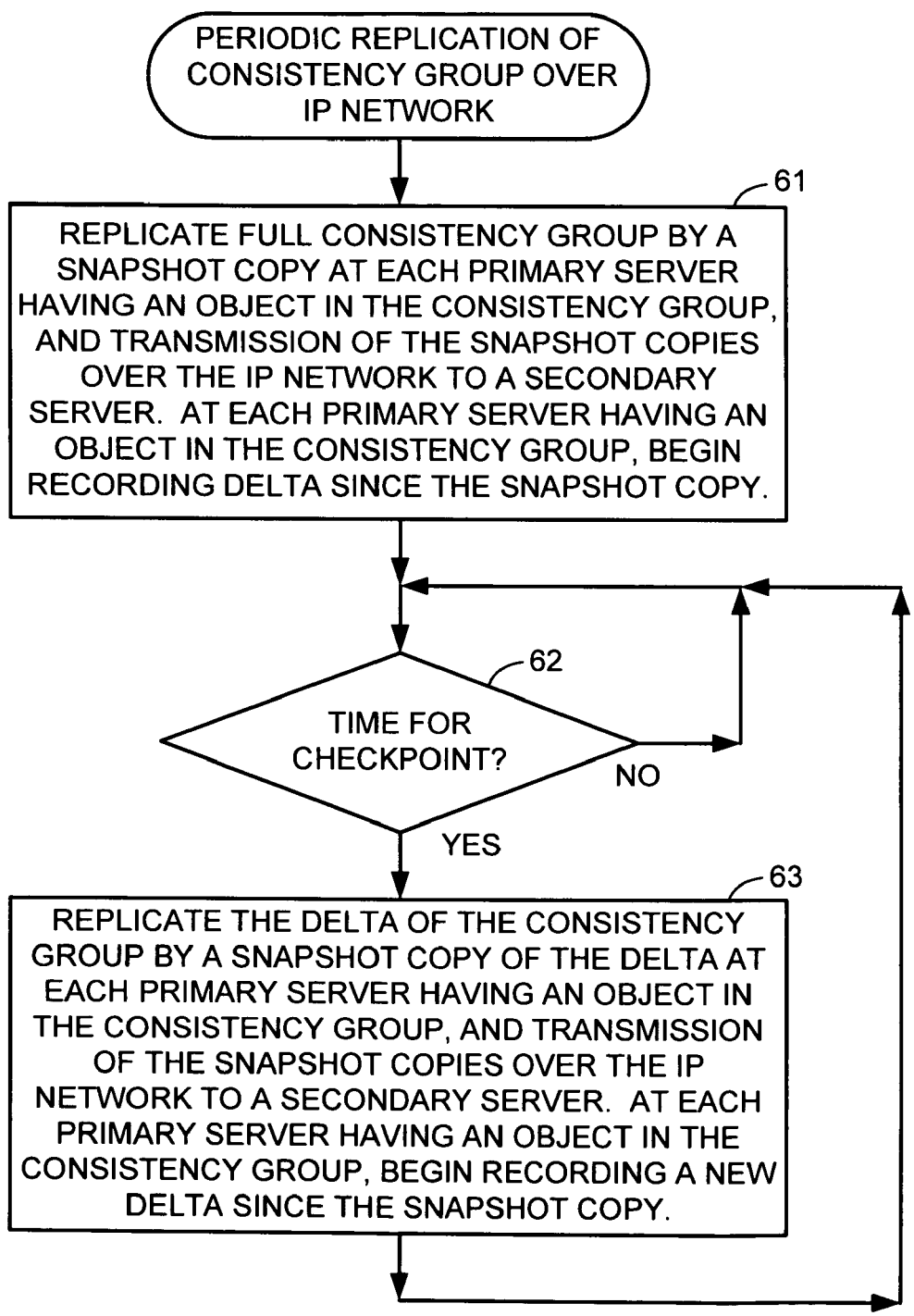
FIG. 5 is a flowchart of a procedure for periodic replication of a consistency group over the network in FIG. 1, FIG. 3 or FIG. 4.

FIG. 5 shows a procedure for periodic replication of a consistency group over the network in FIG. 1, FIG. 3 or FIG. 4. In a first step 61, a full consistency group is replicated by a snapshot copy process at each primary server having an object in the consistency group, and transmission of the snapshot copies over the IP network to at least one secondary server. Also, for replication of a differential consistency group in step 63, a process of recording a delta since the time of creation of the snapshot copy is begun at each primary server having an object in the consistency group. A snapshot copy can be transmitted from each primary server over the IP network to multiple secondary servers, and the snapshot copies can be forwarded or cascaded from secondary servers to tertiary servers in the IP network, as shown and described in the above-cited Raman et al., U.S. Patent Application Publication No. US 2003/0217119 A1.

Figure 6:
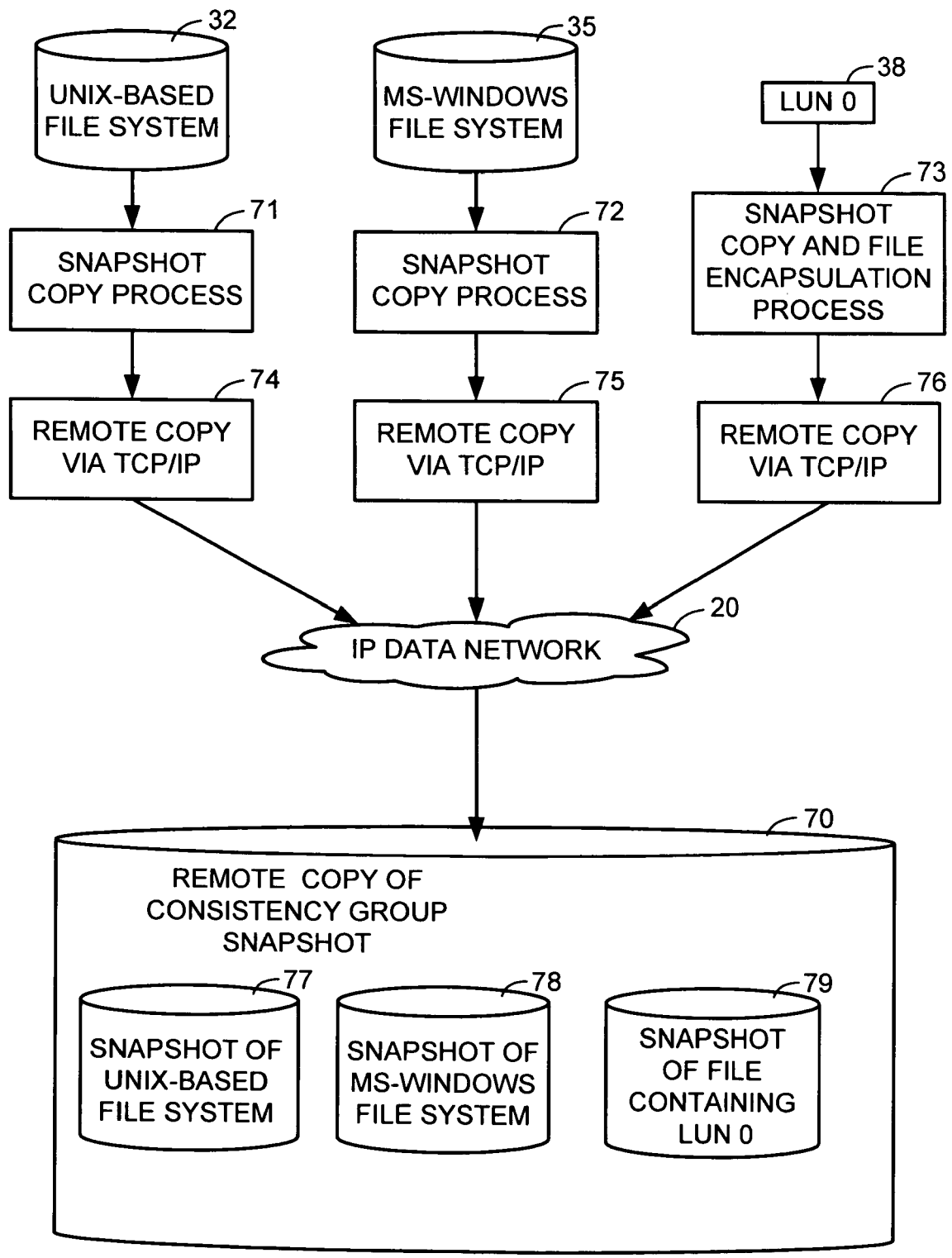
FIG. 6 is a flow diagram showing the replication of a snapshot copy of a consistency group.

FIG. 6 shows the flow of data and the state of the IP network resulting from the replication of a full consistency group (from the primary servers 21, 22, and 23 in FIG. 1, as described above with reference to step 61 of FIG. 5). In the example of FIG. 6, the consistency group includes data from the UNIX-based file system 32, the MS-Windows file system 35, and the LUN 0. Since the consistency group is a full consistency group, the remote copy 70 includes a full snapshot copy 77 of the UNIX-based file system, a full snapshot copy 78 of the MS-Windows file system 78, and a full snapshot copy of LUN 0. The snapshot copy of the Unix-based file system is made by a snapshot copy process 71 (performed by the snapshot facility 33 of the NFS primary file server 21 of FIG. 1), the snapshot copy of the MS-Windows file system is made by a snapshot copy process 72 (performed by the snapshot facility 36 of the CIFS primary server 22 in FIG. 1), and the snapshot copy of the LUN 0 is made by a snapshot copy process 73 (performed by the snapshot facility 41 of the iSCSI primary server in FIG. 1).

So that the process of replication over IP can be done by an RCP facility replicating files for all of the data storage object types (NFS, CIFS, and iSCSI), the snapshot copy process upon the LUN 0 includes encapsulation of the LUN snapshot copy into a file. The snapshot copy of the Unix-based file system is replicated over the IP network 20 by an RCP process (performed by the RCP facility 34 of the NFS primary server 21 in FIG. 1), the snapshot copy of the MS-Windows file system 35 is replicated over the IP network 20 by an RCP process (performed by the RCP facility 37 of the CIFS primary server 22), and the file encapsulating the snapshot copy of the LUN 0 is replicated over the IP network 20 by an RCP process (performed by the RCP facility 42 of the iSCSI primary server 23).

Returning now to FIG. 5, after step 61, execution continues to step 62, to wait until it is time to perform a periodic replication of the delta of the consistency group. When a certain amount of time has elapsed since the last snapshot of the consistency group, execution continues from step 62 to step 63. In step 63, the delta of the consistency group is replicated by a snapshot copy of the delta at each primary server having an object in the consistency group, and transmission of the snapshot copies over the IP network to the secondary server or servers to which the full snapshot copies were sent in step 61. Also, at each primary server having an object in the consistency group, the snapshot facility begins recording a new delta since the snapshot copy. Then execution loops back from step 63 to step 62, so that deltas of the consistency group are periodically replicated from the primary servers to the one or more secondary servers.

Figure 7:
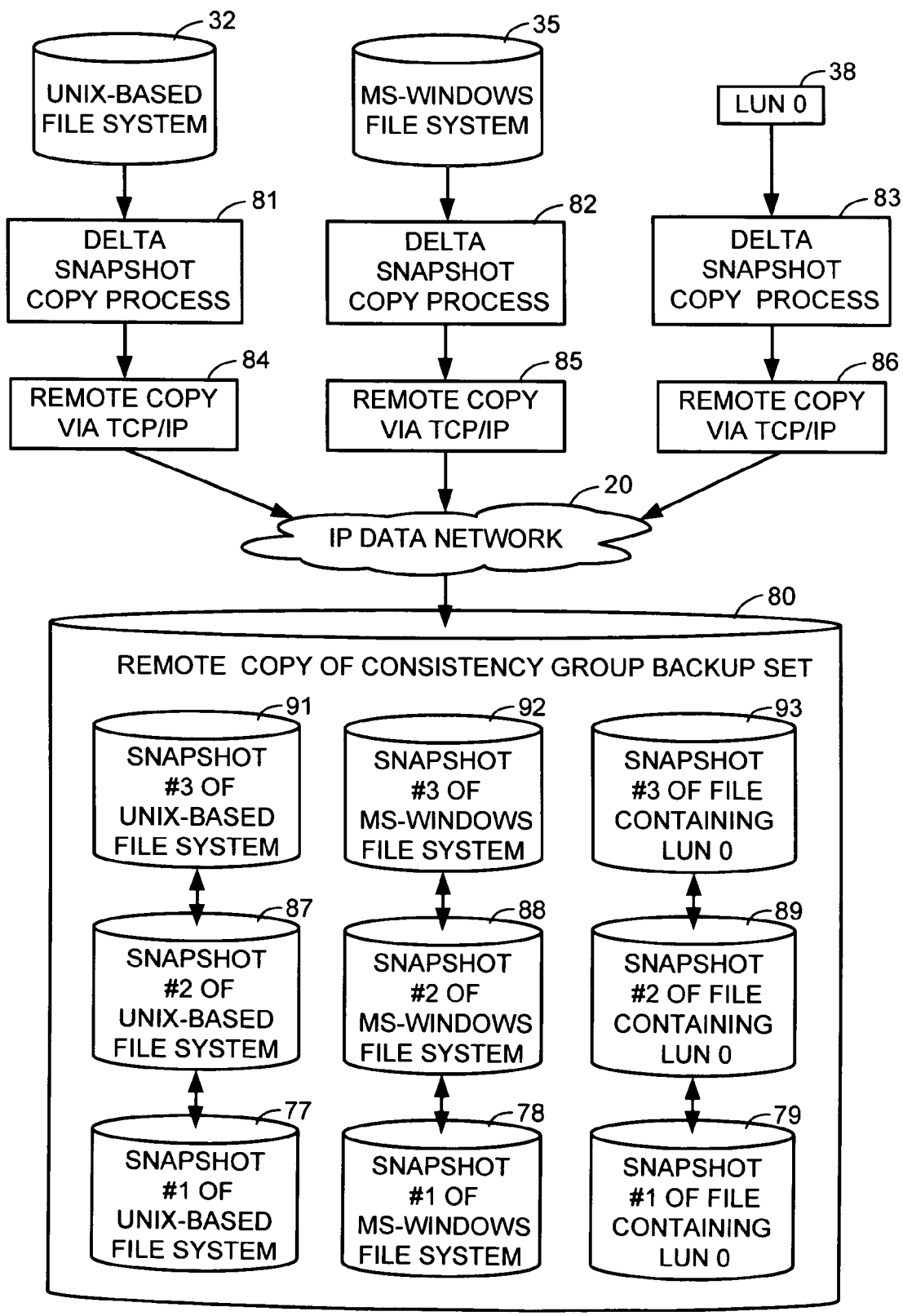
FIG. 7 is a flow diagram showing the replication of a snapshot copy of a change in a consistency group between checkpoints.

FIG. 7 shows the flow of data and the state of the IP network resulting from the replication of two differential consistency groups (from the primary servers 21, 22, and 23 in FIG. 1, as described above with reference to step 63 of FIG. 5). A remote copy 80 of a consistency group backup set 80 has been replicated to the secondary server (28 in FIG. 1). The consistency group backup set 80 includes a first version of the consistency group (including the snapshot copies 77, 78, and 79 all created concurrently at a first point in time), a second version of the consistency group (including snapshot copies 87, 88, and 89 all created concurrently at a second point in time), and a third version of the consistency group (including the snapshot copies 91, 92, and 93 all created concurrently at a third point in time). The snapshot copies are created by respective delta snapshot copy processes 81, 82, 83 (performed by the respective snapshot facilities 33, 36, and 41 and replication facilities 46, 47, 48 in the respective primary servers 21, 22, 23 in FIG. 1). The deltas in Delta Extent format are transmitted over the IP network 20 by respective RCP processes 84, 85, 86 (performed by the respective RCP facilities in the respective primary servers 21, 22, 23 in FIG. 1). In the secondary server (28 in FIG. 1), the snapshots copies in the different versions of the consistency group in the backup set 80 are reconstructed from the deltas. Once a delta of an object is completely replicated to a secondary server, the secondary server makes available a snapshot corresponding to this delta. In a background process in the secondary server, the delta can be integrated into an immediately preceding snapshot of the object concurrent with access to the snapshot corresponding to the delta. See, for example, Raman et al., US 2003/0217119 A1 cited above.

To ensure that the data storage objects in each consistency group will in fact be consistent with each other, the snapshot copy process in each primary server should temporarily suspend write access of applications to the objects to be included in the consistency group. It is desired for the write access to be suspended for a minimum amount of time. At the time of this temporary suspension, any write transactions by applications that are in progress upon these objects should be aborted or should complete before the snapshot copy is taken upon these objects. In this fashion, the applications and the objects should be put into a quiescent state before the snapshot is taken.

Good programming practices should ensure that once an application begins a transaction, the transaction should complete within a reasonable amount of time, and if the transaction does not complete within a reasonable amount of time, the transaction can be aborted in such a way that objects being accessed by the transaction are returned to their initial state when the transaction was begun. Unfortunately, many legacy applications have not followed good programming practices. The sharing of datasets by multiple applications may lead to conflicting inter-dependencies as applications attempt to gain exclusive locks upon multiple objects. These conflicts may arise unexpectedly between different types of data storage objects that in the past were not shared between or among servers.

Where good programming practices have been followed, conflicts may still arise due to some bugs that invariably escape detection during program development and testing, and due to program corruption from various sources. These kinds of conflicts sometimes cause an application program to fail to shut down at the request of an operating system when the operating system is attempting to shut down a computer. In this situation, the operating system usually can revoke the access rights of the application and shut down the application, but this may result in an inconsistent state among the data storage objects accessed by the application program.

In accordance with an aspect of the present invention, a primary server is programmed to respond to a client request to prepare for replication of a full or delta snapshot copy of a data storage object by determining whether or not the replication from the server is expected to occur without a consistency error, and returning a reply to the client indicating whether or not replication is expected to occur without a consistency error. In this way, the client can report or resolve problems that would prevent the replication of consistent data from the server. For replication of a consistency group from multiple servers, for example, significant disruption of the system may be avoided by delaying replication until all of the servers are prepared for replication. The client, with or without assistance of a system administrator, could decide to attempt the replication without resolving the problem, or the client could abort the preparation of the replication and retry replication once an attempt is made to resolve the problem. For example, the client could shut down applications that might be causing the problem, run a consistency check and repair of file systems used by the applications (e.g., by invoking operating system utilities such as the UNIX "fsck" utility), restart the applications, and retry preparation for replication. The client, for example, is the client PC 26 of the system administrator 27 in FIG. 1, or the control station 56 in FIG. 4.

Figure 8:
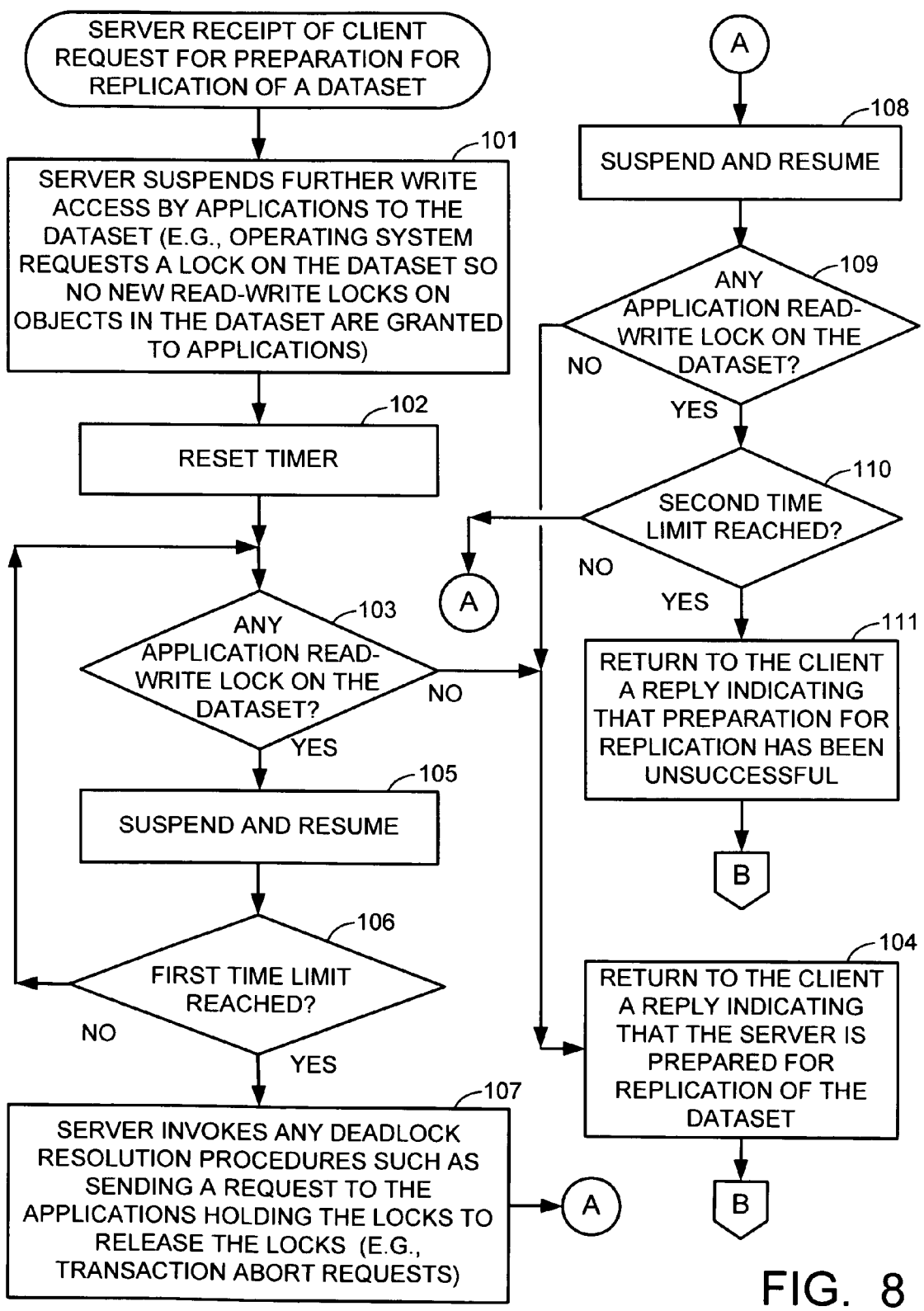
FIGS. 8 and 9 comprise a flowchart of a procedure executed by a server for responding to a request from a client for preparing a dataset for replication, and then responding to either a related request from the client for replicating the dataset regardless of whether the dataset has been prepared for consistent replication, or a related request for aborting any preparation of the dataset for replication.
Figure 9:
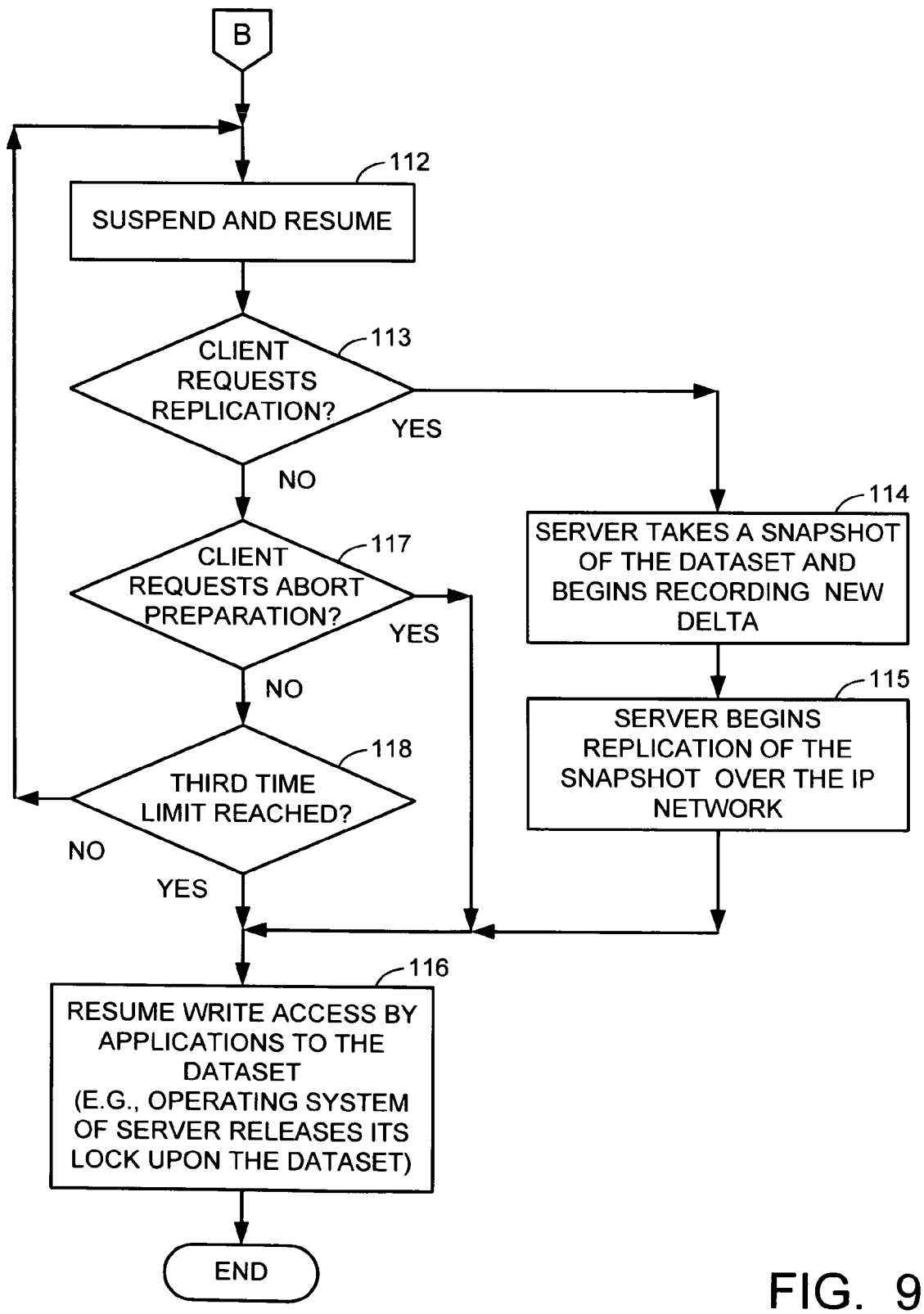

FIGS. 8 and 9 show an example of how a server can be programmed for responding to a request from a client for preparing a dataset for replication, and then responding to either a related request from the client for replicating the dataset regardless of whether the dataset has been prepared for consistent replication, or a related request for aborting any preparation of the dataset for replication. In a first step 101 of FIG. 8, the server suspends further write access by applications to the dataset. For example, the operating system of the server requests a read-write lock on the dataset so that no new read-write locks on objects in the data set are granted to applications. This could be done by the operating system placing such a request at the head of a wait list for locks upon the dataset. In step 102, the server resets a timer. In step 103, if there is not any application read-write lock on the dataset, then execution branches to step 104. In step 104, the server returns to the client a reply indicating that the server is prepared for replication of the dataset.

In step 103, if an application has a read-write lock upon the dataset, then execution of the routine in FIG. 8 is suspended and resumed in step 105. In step 106, if a first period of time has not yet elapsed since the resetting of the timer in step 102, then execution loops from step 106 back to step 103. If this first time limit is reached in step 106 (without the applications releasing their read-write locks upon the dataset), then execution continues to step 107. In step 107, the server invokes any deadlock resolution procedures applicable to the dataset and the applications holding read-write locks upon the dataset. For example, the server may send lock release requests to the applications holding the read-write locks upon the dataset, and the applications may abort pending transactions to release these locks. Execution continues to step 108 to suspend and resume execution. In step 109, if no application has a read-write lock upon the dataset, then execution branches to step 104. Otherwise, if an application still has a read-write lock on the dataset, then execution continues to step 110. In step 110, if a second time limit is not reached (since the resetting of the timer in step 102), then execution loops from step 110 back to step 108. Otherwise, if the second time limit is reached, execution continues to step 111. In step 111, the server returns to the client a reply indicating that preparation for replication has been unsuccessful. From step 111 and from step 104, execution continues to step 112 in FIG. 9.

In step 112 of FIG. 9, execution is suspended and resumed. In step 113, if the server has received a request for replication (regardless of whether or not the server is prepared to replicate without a dataset consistency error), then execution branches to step 114. In step 114, the server takes a full or delta snapshot copy of the dataset and begins recording new delta of the dataset. In step 115, the server begins replication of the snapshot over the IP network. In step 116, the server resumes write access by applications to the dataset. For example, in step 116, the operating system of the server releases its lock upon the dataset.

In step 113, if the client has not requested replication, then execution continues to step 117. In step 117, if the client requests the server to abort any preparation for replication, then execution branches to step 116 to resume write access by applications to the dataset. Otherwise, execution continues from step 117 to step 118. In step 118, if a third time limit is not reached (since the resetting of the timer in step 102), then execution loops from step 118 back to step 112. Otherwise, once the third time limit is reached, then execution continues to step 116 to resume write access by the applications to the dataset.

Figure 10:
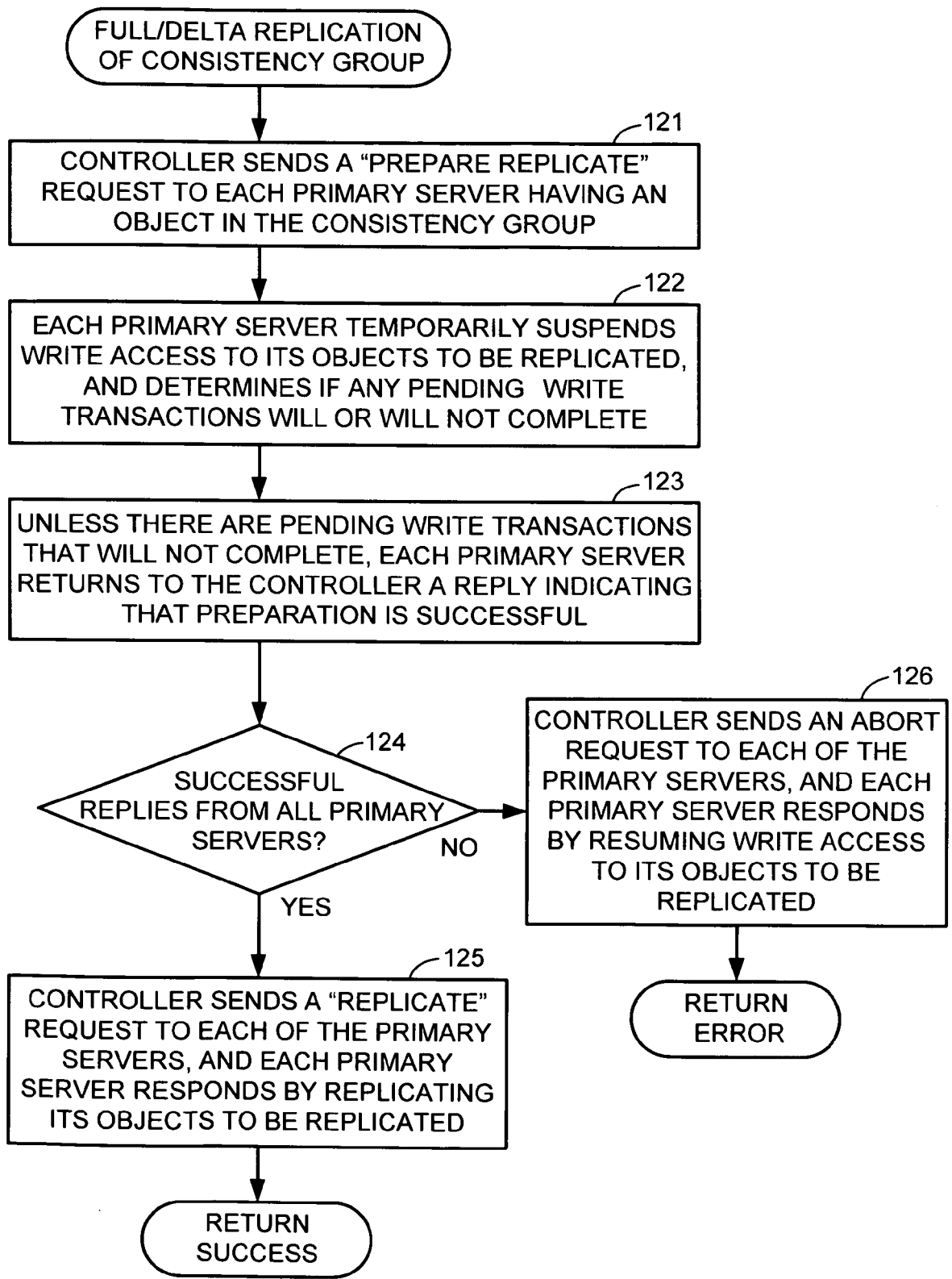
FIG. 10 is a flowchart of a procedure for coordinating primary servers for ensuring that diverse data storage objects can be consistent within a group during a full or delta replication of the consistency group without significant disruption to concurrent write access by applications to the data storage objects at the primary servers.

FIG. 10 shows a procedure for coordinating primary servers for a full or delta replication of a consistency group. In this example, one of the clients functions as a controller for the replication. In a first step 121, the controller sends a "prepare replicate" request to each of the primary servers having objects in the consistency group. In step 122, each primary server responds to the "prepare replicate" request by temporarily suspending write access of applications to its objects to be replicated, and determines if any pending transactions will or will not complete, for example, as described above with reference to FIGS. 8-9. In step 123, unless there are pending transactions that will not complete, each primary server returns to the controller a reply indicating that preparation is successful. In step 124, if the coordinator receives successful replies from all of the primary servers, then execution continues to step 125. In step 125, the controller sends a "replicate" request to each of the primary servers, and each primary server responds by replicating its objects to be replicated. After step 126, execution returns from the routine of FIG. 10 with a report of successful completion.

In step 124, if the coordinator fails to receive replies from all of the servers indicating that preparation for replication has been successful, then execution branches to step 126. In step 126, the controller sends an abort request to each of the primary servers, and each primary server responds by resuming write access to its objects to be replicated. After step 126, execution returns from the routine of FIG. 10 with a report of an error.

Figure 11:
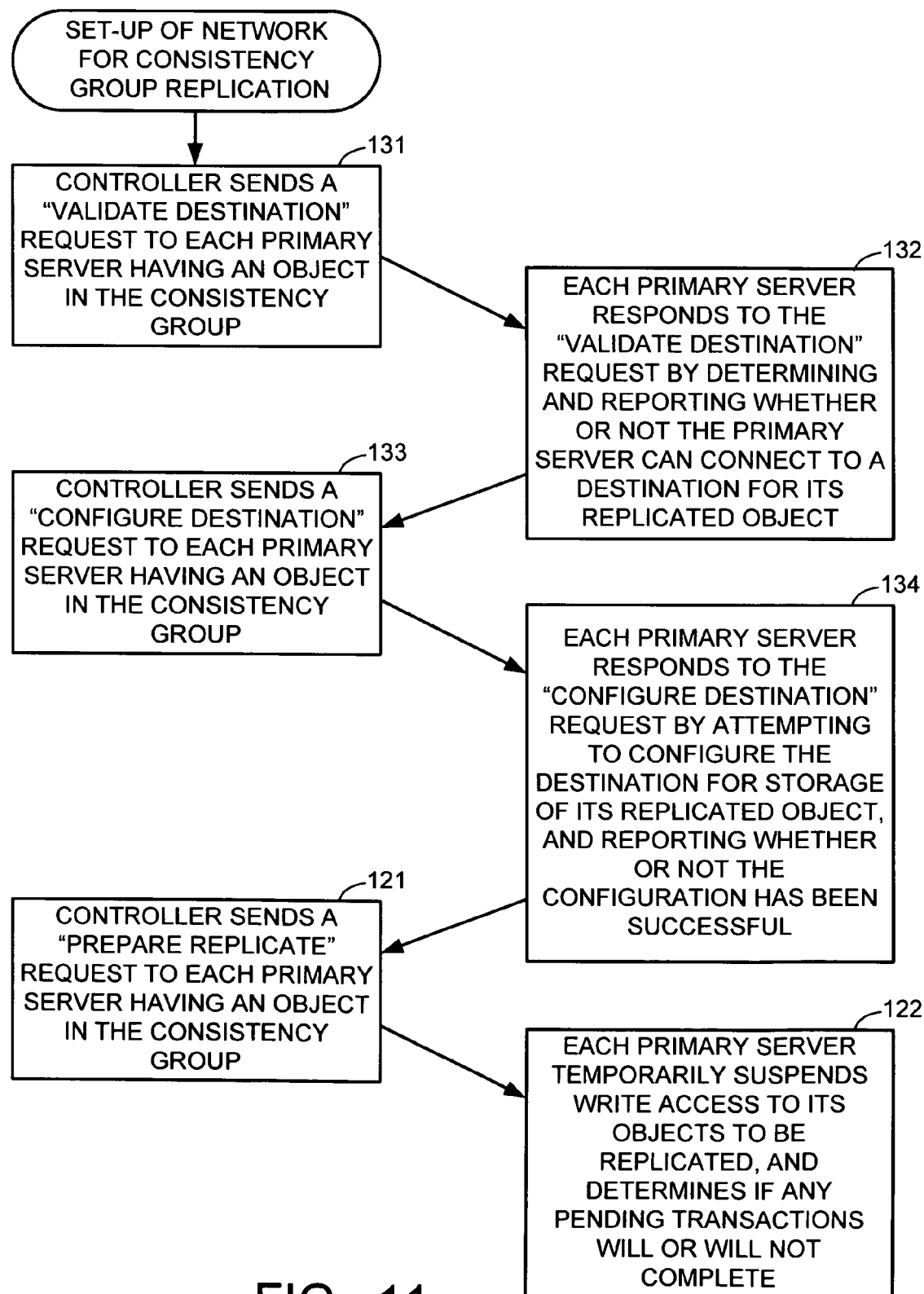
FIG. 11 is a flowchart showing the use of a "validate destination" request and a "configure destination" request before a "prepare replicate" request.

FIG. 11 is a flowchart showing the use of a "validate destination" request and a "configure destination" request before a "prepare replicate" request. A "validate destination" request allows the caller to verify that a source server can connect to the destination server and that the destination server is programmed to function as a destination server for receipt of replicated data. A "configure destination" request allows the caller to request the source server to configure a destination in the destination server for replicated data from the source server. For example, the caller may request the source server to configure a container object in the destination server and to reserve sufficient storage space in the container object for storage of the replicated data from the source server. The container object, for example, is a directory for receiving replicated objects of a consistency group. By sending a "validate destination" request and a "configure destination" request before a "prepare replicate" request, it is possible for a client to detect connection or configuration problems that would prevent successful replication and therefore avoid preparation for replication that would not be successful. Thus, the client may correct these connection or configuration problems before the suspension of client write access to distributed objects of a dataset to be replicated. In this fashion, it is possible to avoid unnecessary disruption of the client write access to the distributed objects of the dataset to be replicated while the connection or configuration problems are solved.

As shown in FIG. 11, in a first step 131, the controller sends a "validate destination" request to each primary server having an object in the consistency group. In step 132, each primary server responds to the "validate destination" request by determining and reporting back to the controller whether or not the primary server can connect to a destination for its replicated object. If any primary server reports back to the controller that there is a destination validation problem, then the controller can fix this problem before continuing to the next step 133. In step 133, the controller sends a "configure destination" request to each primary server having an object in the consistency group. In step 134, each primary server responds to the "configure destination" request by attempting to configure the destination for storage of its replicated object and reporting back to the controller whether or not the configuration has been successful. If any primary reports back to the controller that there is a destination configuration problem, then the controller can fix this problem before continuing to the next step 121. In step 121, the controller sends a "prepare replicate" request to each primary server having an object in the consistency group. In step 122, each primary server responds to the "prepare replicate" request by temporarily suspending write access to its objects to be replicated, and determining if any pending transactions will or will not complete. Execution continues from steps 121 and 122 as shown and described above with reference to FIG. 10.

Figure 12:
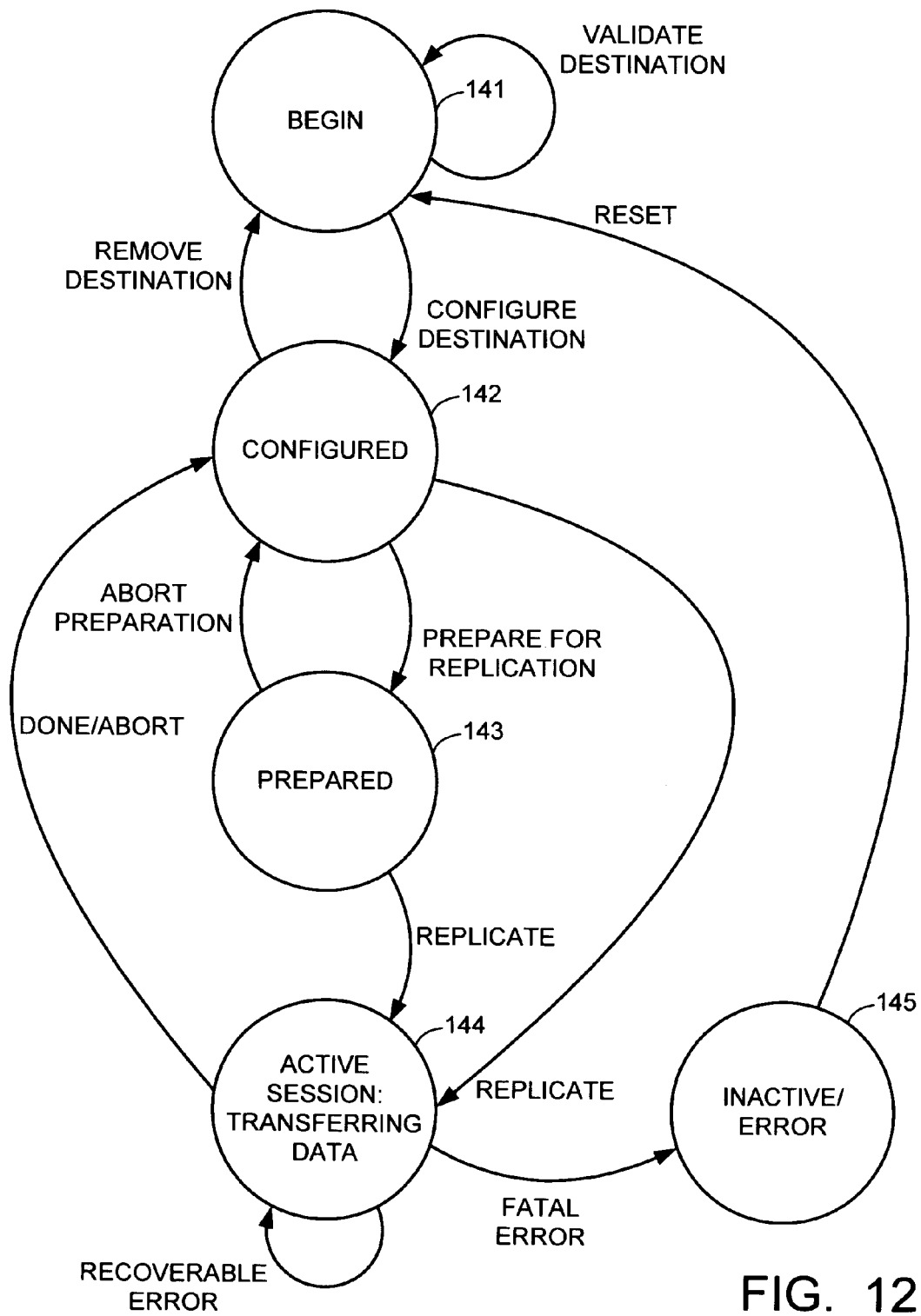
FIG. 12 is a state transition diagram for the coordination of primary servers and the replication of a consistency group of data storage objects from the primary servers using the procedure of FIGS. 10 and 11.

FIG. 12 is a state transition diagram for the coordination of primary servers and the replication of a consistency group of data storage objects from the primary servers to a secondary server using the procedure of FIGS. 10 and 11. The system has five states pertinent to the replication process. These states include a "begin" state 141, a "configured" state 142, a "prepared" state 143, an "active session" state 144, and an "inactive/error" state 145.

The "begin" state 141 is the initial state of the system. In this state, a client such as a coordinator for the replication of a consistency group can validate a destination for the consistency group by sending a "validate destination" request to each primary server having an object in the consistency group, as described above with reference to FIG. 11. The system transitions from the "begin" state 141 to the "configured" state 142 when the coordinator has configured the system by sending a "configure destination" request to each primary server having an object in the consistency group, and each of the primary servers has reported back to the coordinator that configuration of the destination has been successful. The system transitions from the "configured" state 142 back to the "begin" state 141 when the coordinator sends a "remove destination" request to each primary server having an object in the consistency group.

The system transitions from the "configured" state 142 to the "prepared" state 143 when the coordinator has prepared the system for replication by sending a "prepare replicate" request to each primary server having an object in the consistency group, and each of the primary servers reports back to the coordinator that preparation for replication has been successful. The system transitions from the "prepared" state 143 back to the "configured" state 142 when the coordinator sends an "abort preparation" request to each primary server having an object in the consistency group. The system transitions from the "prepared" state 143 to the "active session" state 144 when the coordinator sends a "replicate" request to each primary server having an object tin the consistency group.

In the "active session" state, the primary servers transfer replication data to the secondary server. Once a snapshot copy of the consistency group has been replicated to the secondary server, the system transitions from the "active session" state 144 back to the "configured" state 142. The system also transitions from the "active session" state 144 back to the "configured" state 142 when the coordinator sends an "abort replication" request to each primary server having an object in the consistency group. If a recoverable error occurs when the system is in the "active session" state 144, the transferring of data will continue in the "active session" state upon recovery from the error. If a fatal error occurs when the system is in the "active session" state 144, then the system will transition to the "inactive/error" state 145. The fatal error is reported to the coordinator. The system remains in the "inactive/error" state 145 until the coordinator sends a "reset" request to each primary server having an object in the consistency group.

Figure 13:
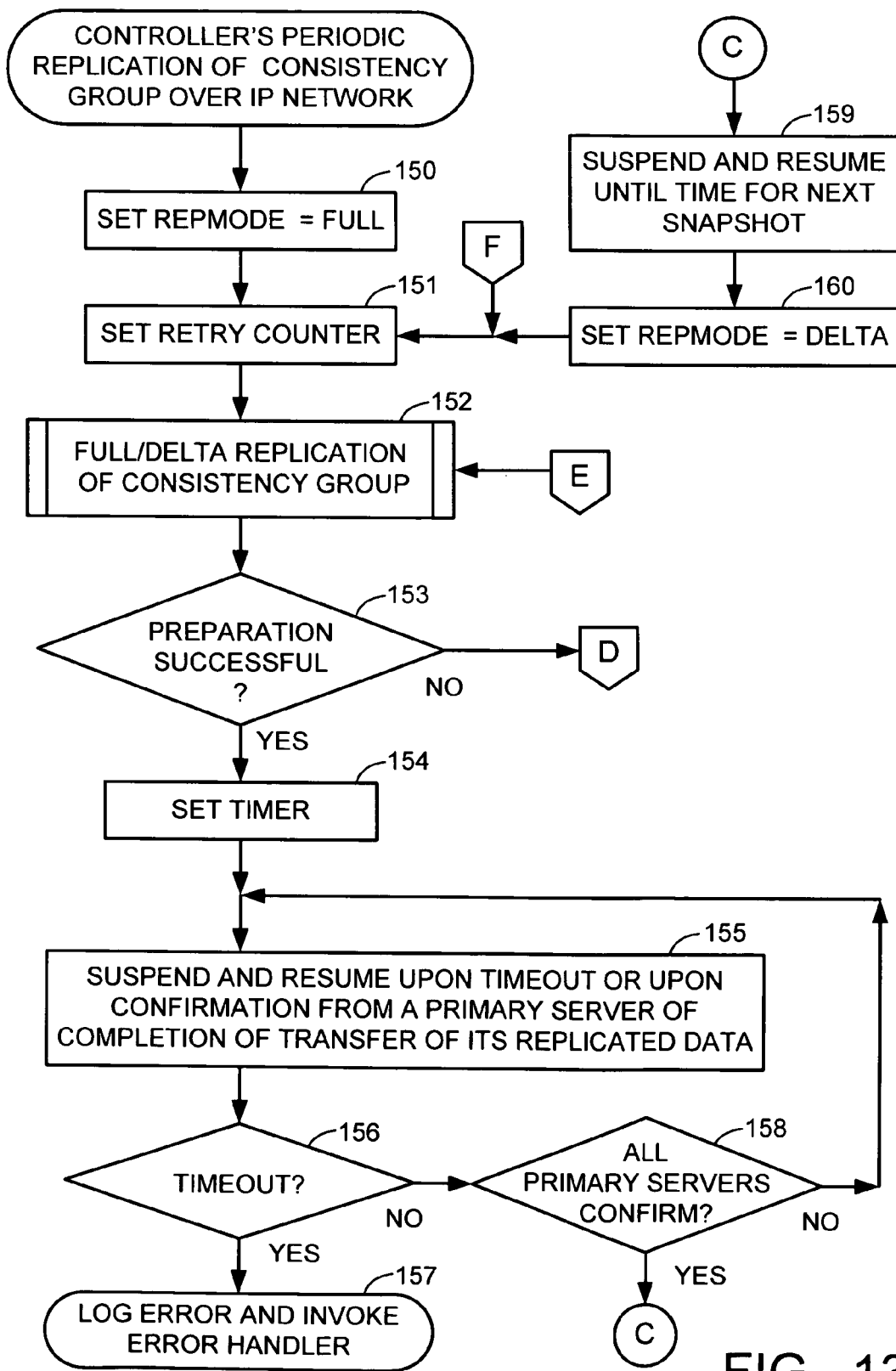
FIGS. 13 and 14 together comprise a flowchart using the routines of FIGS. 8 to 11 for implementing the procedure of FIG. 5 for periodic replication of a consistency group over the network.
Figure 14:
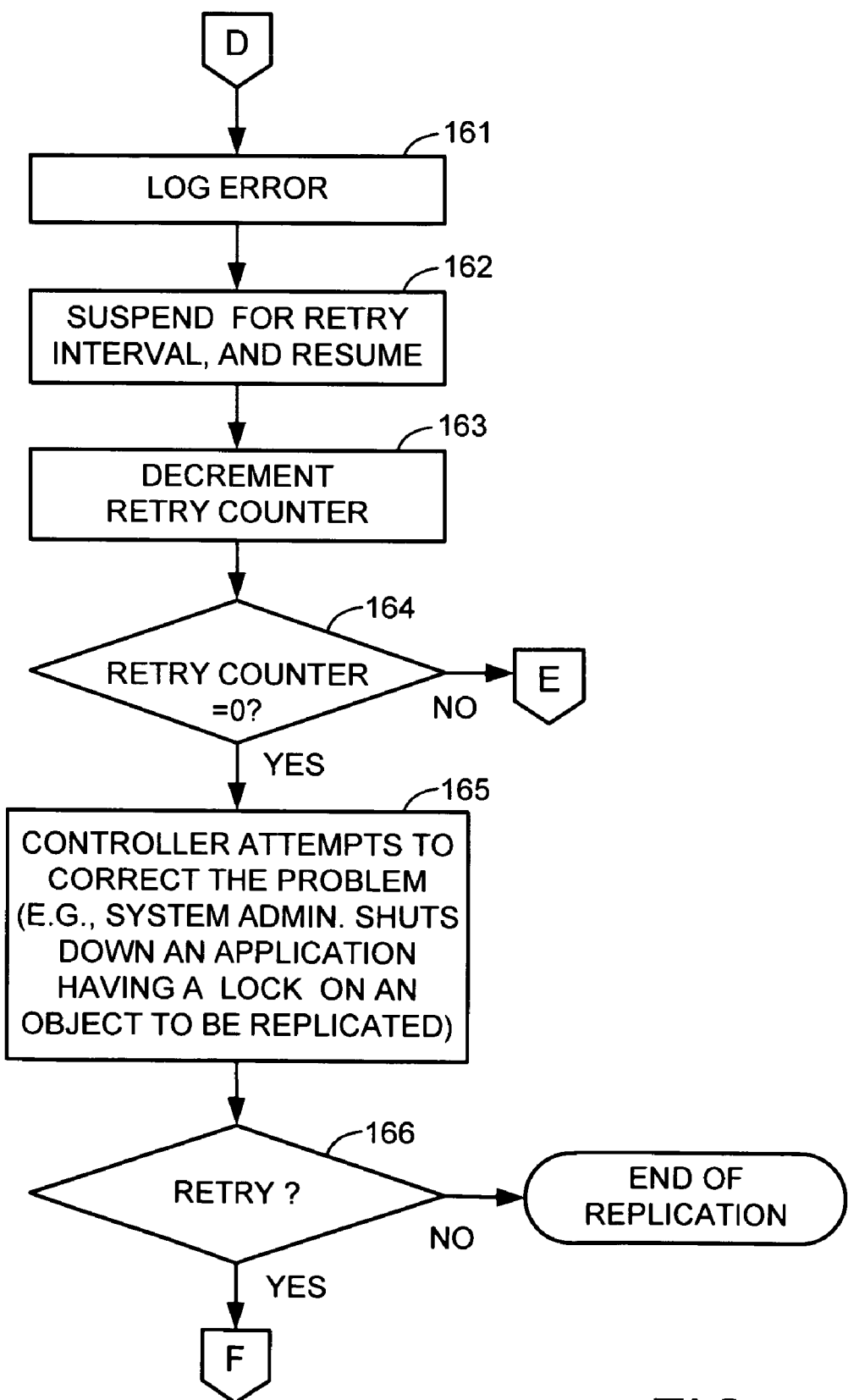

FIGS. 13 and 14 show a way of using the routines of FIGS. 8 to 11 for programming a controller to control periodic replication of a consistency group over the network from multiple primary servers in accordance with the general procedure shown in FIG. 5. In a first step 151 of FIG. 13, the controller sets a replication mode flag (REPMODE) to "FULL". Next, in step 151, the controller sets a retry counter with an integer constant specifying a number of consecutive times that preparation for replication of the consistency group may be tried before the controller takes further action to correct a failure of all the primary servers to report that they are prepared for replication. For example, the retry counter is set to a value of three. Next, in step 152, controller invokes the routine of FIGS. 10 and 11 to begin a full or delta replication of the consistency group, as selected by the replication mode flag (REPMODE) initially set to "FULL" in step 150.

In step 153, if execution returns from step 125 of the routine of FIG. 10 reporting that preparation was successful, then execution continues from step 153 to step 154. In step 154, the controller sets a timer with a value specifying a maximum duration of time permitted for replication of the consistency group without logging an error and invoking an error handler. In step 155, execution of the routine of FIG. 13 is suspended, and resumes upon the timeout of the timer or upon confirmation from a primary server of completion of transfer of its replicated data. In step 156, if execution resumes due to a timeout, then execution continues to step 157 to log the timeout error and invoke an error handler. Otherwise, if a timeout did not occur, execution resumed because a primary server reported a confirmation of completion of transfer of its replicated data, and execution branches from step 156 to step 158.

In step 158, if all of the primary servers have not confirmed completion of transfer of their respective replicated data, then execution continues from step 158 back to step 155. Once all of the primary servers have confirmed completion of transfer of their respective replicated data, execution branches from step 158 to step 159. In step 159, the execution of the routine in FIG. 13 is suspended until it is time for a next snapshot of the consistency group. For example, snapshots are taken every twenty minutes. Then execution continues to step 160. In step 160, the replication mode flag (REPMODE) is set to "DELTA". From step 160, execution loops back to step 151 to reset the retry counter, in order to perform a delta replication of the consistency group in step 152.

In step 152, if execution returns reporting that preparation was unsuccessful, then execution branches from step 153 to step 161 in FIG. 14. In step 161, the controller logs the error. Next, in step 162, execution of the routine in FIG. 14 is suspended for a retry interval, and then execution resumes and continues to step 163. For example, during such a retry interval, a condition preventing preparation, such as temporary network congestion holding up the release of a conflicting lock, might have disappeared during the normal course of data processing in the network. In step 163, the retry counter is decremented by one. In step 164, if the retry counter has not been decremented to zero, then execution loops back from step 164 to step 152 in FIG. 2 to again try to prepare for replication.

In step 164, if the retry counter has been decremented to zero, then execution continues to step 165. In step 165, the controller attempts to correct the problem that has prevented successful preparation. For example, the controller requests a system administrator to shut down and restart applications that might be causing a deadlock among the primary servers. If in step 166 it is possible that the problem has been corrected, then execution branches from step 166 back to step 151 to reset the retry counter in order to retry preparation for replication of the consistency group. If in step 166 it is not possible that the problem has been corrected, then replication is terminated.

In view of the above, consistency errors may arise during replication of diverse data storage objects from servers in a data network. For preventing consistency errors, a server is programmed for responding to a request for a report of whether or not the server can replicate a dataset from computer data storage of the server without causing a consistency error. Such a report is useful for replicating a consistency group of data storage objects from more than one server. Preparation for replication can be begun at each of the servers, and if any of the servers fail to report that replication can be done without causing a consistency error, then the preparation can be aborted so that write access by applications will not be disrupted while the potential problem is diagnosed and eliminated.

What is claimed is:

1. In a data processing network including a first server, a computer-implemented method comprising the steps of:

receiving a request to determine whether or not the first server can replicate a first dataset from computer data storage of the first server without causing a consistency error, and responding to the request by determining whether or not the first server can replicate the first dataset from the computer data storage of the first server without causing a consistency error, and reporting whether or not the first server can replicate the first dataset from the computer data storage of the first server without causing a consistency error;

wherein the first server determines whether or not the first server can replicate the first dataset from the computer data storage of the first server without causing a consistency error by suspending write access of applications to the first dataset, and then checking whether any applications fail to release any read-write locks upon the first dataset;

wherein the data processing network includes a plurality of second servers providing access of applications to respective second datasets, and wherein a controller sends, to each of the second servers, a request to determine whether or not each of the second servers can replicate the respective second dataset without causing a consistency error, and wherein each of the second servers returns, to the controller, a report of whether or not said each of the second servers can replicate the respective second dataset without causing a consistency error; and which includes the controller receiving the reports from the second servers, and upon checking that all of the second servers can replicate their respective second datasets without causing consistency errors, the controller sending a replicate request to each of the second servers in order to replicate a consistency group of the second datasets from the second servers.

2. The computer-implemented method as claimed in claim 1, wherein the data processing network includes a client operated by a system administrator, and the client originates the request to determine whether or not the first server can replicate the first dataset from the computer data storage of the first server without causing a consistency error, and the client receives the report of whether or not the first server can replicate the first dataset from the computer data storage of the first server without causing a consistency error.

3. The computer-implemented method as claimed in claim 1, wherein the first server reports that the first dataset cannot be replicated from the computer data storage of the first server without a consistency error, and wherein the method further includes a system administrator responding to the report by shutting down an application having access to the first dataset.

4. The computer-implemented method as claimed in claim 1, which further includes the first server receiving a destination validation request to determine whether or not the first server can connect to a destination for replicated data from the first dataset; and the first server responding to the destination validation request by determining whether or not the first server can connect to the destination for the replicated data from the first dataset, and reporting whether or not the first server can connect to the destination for the replicated data from the first dataset.

5. The computer-implemented method as claimed in claim 1, which further includes the first server receiving a destination configuration request to configure a destination for replicated data from the first dataset; and the first server responding to the destination configuration request by attempting to configure the destination for storage of replicated data from the first dataset, and reporting whether or not the destination for the replicated data from the first dataset has been successfully configured for storage of the replicated data from the first dataset.

6. The computer-implemented method as claimed in claim 1, wherein clients in the data processing network use different high-level storage access protocols to access the respective second datasets.

7. The computer-implemented method as claimed in claim 1, wherein at least one application holds a read-write lock upon the first dataset when the first server suspends write access of applications to the first dataset, and the first server requests said at least one application to release the read-write lock upon the first dataset.

8. The computer-implemented method as claimed in claim 1, which includes replicating the first dataset by activating a snapshot facility in the first server to take a snapshot copy of the first dataset in the computer data storage of the first server, and activating a replication control protocol facility in the first server to replicate the first dataset over the data processing network from the first server using the Transmission Control Protocol.

9. The computer-implemented method as claimed in claim 1, wherein the method includes replicating a first snapshot copy of the first dataset over the data processing network from the first server and then replicating, over the data processing network from the first server, changes made to the first dataset from the time of the first snapshot copy of the first dataset up to a time of making a second snapshot copy of the first dataset.

10. The computer-implemented method as claimed in claim 1, wherein the first dataset includes a logical unit number (LUN) of storage, and the method includes encapsulating the logical unit number (LUN) of storage in a file and replicating the file over the data processing network from the first server.

11. In a data processing network including a server, a computer-implemented method comprising the steps of:

receiving a request to determine whether or not the server can replicate a dataset from computer data storage of the server without causing a consistency error, and responding to the request by determining whether or not the server can replicate the dataset from the computer data storage of the server without causing a consistency error, and reporting whether or not the server can replicate the dataset from the computer data storage of the server without causing a consistency error;

wherein the data processing network includes a plurality of servers providing access of applications to respective datasets, and wherein a controller sends, to each of the servers, a request to determine whether or not each of the servers can replicate the respective dataset without causing a consistency error, and wherein each of the servers returns, to the controller, a report of whether or not said each of the servers can replicate the respective dataset without causing a consistency error; and which includes the controller receiving the reports from the servers, and upon checking that all of the servers can replicate their respective datasets without causing consistency errors, the controller sending a replicate request to each of the servers in order to replicate a consistency group of the datasets from the servers.

* * * * *